US009731618B2

(12) United States Patent
Asai et al.

(10) Patent No.: US 9,731,618 B2
(45) Date of Patent: Aug. 15, 2017

(54) INFORMATION PROVISION APPARATUS AND INFORMATION PROVISION METHOD

(71) Applicants: Kentaro Asai, Toyota (JP); Toshiyuki Aga, Nagoya (JP); Masamichi Tani, Nagoya (JP)

(72) Inventors: Kentaro Asai, Toyota (JP); Toshiyuki Aga, Nagoya (JP); Masamichi Tani, Nagoya (JP)

(73) Assignees: TOYOTA JIDOSHA KABUSHIKI KAISHA, Toyota-shi, Aichi-ken (JP); DENSO CORPORATION, Kariya-shi, Aichi-ken (JP); AISIN AW CO., LTD., Anjo-shi, Aichi-ken (JP)

( * ) Notice: Subject to any disclaimer, the term of this patent is extended or adjusted under 35 U.S.C. 154(b) by 26 days.

(21) Appl. No.: 14/377,546

(22) PCT Filed: Feb. 6, 2013

(86) PCT No.: PCT/IB2013/000146
§ 371 (c)(1),
(2) Date: Aug. 8, 2014

(87) PCT Pub. No.: WO2013/117976
PCT Pub. Date: Aug. 15, 2013

(65) Prior Publication Data
US 2014/0371969 A1 Dec. 18, 2014

(30) Foreign Application Priority Data

Feb. 8, 2012 (JP) .................................. 2012-024911

(51) Int. Cl.
*G06F 17/00* (2006.01)
*G06F 19/00* (2011.01)
(Continued)

(52) U.S. Cl.
CPC ............. *B60L 11/1861* (2013.01); *B60L 7/14* (2013.01); *B60L 7/16* (2013.01); *B60L 11/1811* (2013.01);
(Continued)

(58) Field of Classification Search
CPC ................. B60W 10/26; B60W 20/00; B60W 2510/244; B60W 20/13; B60W 2710/244;
(Continued)

(56) References Cited

U.S. PATENT DOCUMENTS 8,655,586 B2 * 2/2014 Jotanotive .......... G01C 21/3469
340/995.17
8,718,844 B2 * 5/2014 Krause .................. B60W 50/14
180/65.29

(Continued)

FOREIGN PATENT DOCUMENTS

JP 2003-262525 A 9/2003
JP 2011-102739 A 5/2011
JP 2011-188596 A 9/2011

*Primary Examiner* — Thomas G Black
*Assistant Examiner* — Demetra Smith-Stewart
(74) *Attorney, Agent, or Firm* — Sughrue Mion, PLLC

(57) ABSTRACT

An information provision apparatus including: a provision control unit (40, 30) configured to provide a vehicle passenger with energy replenishment information relating to energy replenishment of a vehicle-driving energy supply source (20) that is capable of storing regenerative energy regenerated from rotational energy of a vehicle wheel, when a remaining energy amount of the energy supply source (20) falls below a determination reference value; and a modification unit (40) configured to modify a provision condition that is a condition on which the provision control unit (40, 30) provides the energy replenishment information, so that after the energy replenishment information is once provided when the remaining energy amount falls below the determination reference value, the energy replenishment infor-
(Continued)

mation is less likely to be provided than before the energy replenishment information is once provided.

17 Claims, 10 Drawing Sheets

(51) Int. Cl.
*G08B 21/00* (2006.01)
*B60L 11/18* (2006.01)
*B60L 7/14* (2006.01)
*B60L 7/16* (2006.01)
*G01C 21/34* (2006.01)
*H02J 7/00* (2006.01)
*H02J 7/02* (2016.01)

(52) U.S. Cl.
CPC ....... *B60L 11/1816* (2013.01); *B60L 11/1825* (2013.01); *B60L 11/1846* (2013.01); *B60L 11/1887* (2013.01); *G01C 21/3469* (2013.01); *H02J 7/0021* (2013.01); *H02J 7/0027* (2013.01); *H02J 7/02* (2013.01); *B60L 2240/622* (2013.01); *B60L 2240/642* (2013.01); *B60L 2240/72* (2013.01); *B60L 2240/80* (2013.01); *B60L 2250/10* (2013.01); *B60L 2250/16* (2013.01); *Y02T 10/705* (2013.01); *Y02T 10/7044* (2013.01); *Y02T 10/7055* (2013.01); *Y02T 10/7072* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y02T 90/34* (2013.01); *Y04S 30/12* (2013.01); *Y04S 30/14* (2013.01)

(58) Field of Classification Search
CPC ..... B60W 2510/242; B60W 2710/242; B60W 30/188; Y02T 90/16; Y02T 10/7044; Y02T 10/705; Y02T 10/72; Y02T 10/70; Y02T 10/7258; Y02T 10/7072; Y02T 90/14; Y02T 10/7061; Y02T 10/7283; Y02T 90/163; Y10S 903/903; Y10S 903/907; B60L 11/1861; B60L 3/0046; B60L 11/1809; B60L 2240/547; B60L 11/1851; B60L 11/1862
See application file for complete search history.

(56) References Cited

U.S. PATENT DOCUMENTS

| | | | |
|---|---|---|---|
| 9,026,347 B2* | 5/2015 | Gadh | B60L 11/1842 320/109 |
| 9,091,559 B2* | 7/2015 | Hancock | B60L 3/12 |
| 9,091,563 B2* | 7/2015 | Seino | G01C 21/3469 |
| 2010/0049737 A1* | 2/2010 | Ambrosio | B60L 11/1824 705/412 |
| 2010/0138093 A1* | 6/2010 | Oku | B60L 11/18 701/22 |
| 2011/0032110 A1 | 2/2011 | Taguchi | |
| 2011/0298640 A1 | 12/2011 | Tate, Jr. | |
| 2012/0143410 A1* | 6/2012 | Gallagher | B60L 11/1861 701/22 |
| 2012/0158229 A1* | 6/2012 | Schaefer | B60L 11/1842 701/22 |
| 2016/0039301 A1* | 2/2016 | Igarashi | H02J 7/041 320/157 |

* cited by examiner

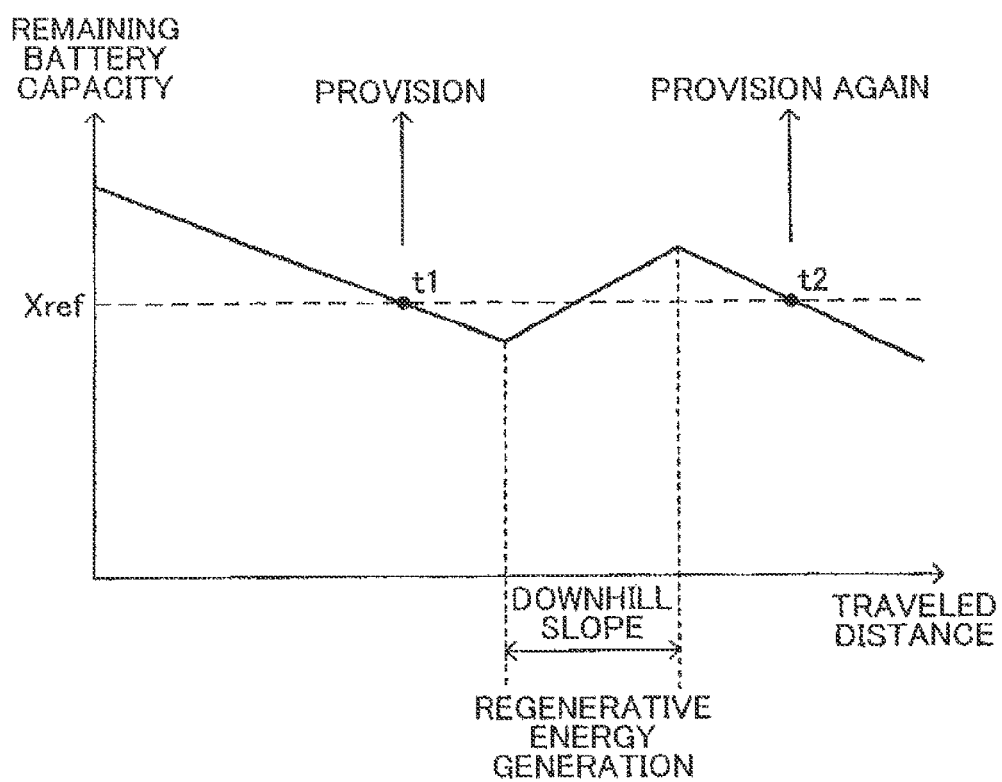

INFORMATION PROVISION APPARATUS AND INFORMATION PROVISION METHOD

CROSS REFERENCE TO RELATED APPLICATIONS

This application is a National Stage of International Application No. PCT/IB2013/000146 filed Feb. 6, 2013, claiming priority based on Japanese Patent Application No. 2012-024911 filed Feb. 8, 2012, the contents of all of which are incorporated herein by reference in their entirety.

BACKGROUND OF THE INVENTION

1. Field of the Invention

The invention relates to an information provision apparatus and an information provision method for providing a vehicle passenger with information relating to energy replenishment of an energy supply source of a vehicle.

2. Description of Related Art

A conventional information provision apparatus provides a vehicle passenger with information relating to a charging facility for charging a battery of an electric vehicle (EV). Such information provision apparatuses are proposed in Japanese Patent Application Publication No. 2003-262525 (JP-2003-262525 A), Japanese Patent Application Publication No. 2011-102739 (JP-2011-102739 A), Japanese Patent Application Publication No. 2011-188596 (JP-2011-188596 A), and so on, for example. In this type of information provision apparatus, a charging facility existing on a periphery of a current location of the vehicle is extracted, and the vehicle passenger is provided with information (charging facility information) indicating a position, a use condition, and so on of the charging facility. The charging facility information is provided using an in-vehicle terminal such as a navigation apparatus when a remaining battery capacity falls below a determination reference value. The vehicle passenger can therefore use the provided information to determine a battery charging timing and locate a nearby charging facility.

SUMMARY OF THE INVENTION

When the EV travels on a downhill slope, for example, a motor for driving a vehicle wheel generates power such that power regeneration is performed, and as a result, the remaining capacity of the battery provided in the EV increases. Therefore, as shown in FIG. 12, for example, after the remaining battery capacity falls below a determination reference value Xref (at time t1) and the charging facility information is once provided, the remaining battery capacity may rise above the determination reference value Xref. In this case, when the vehicle subsequently travels on a flat road after reaching the end of the downhill slope, the remaining battery capacity may fall below the determination reference value Xref again (at time t2). Accordingly, the charging facility information is provided again at time t2. Hence, depending on a traveling condition of the vehicle, the charging facility information is provided more times than necessary. Further, when the information provision apparatus configured to obtain the charging facility information by accessing a server of an information center, the information provision apparatus have to access the server many times.

The invention provides an information provision apparatus and an information provision method for providing information relating to energy replenishment, such as battery charging, appropriately.

A first aspect of the invention is an information provision apparatus including: a provision control unit configured to provide a vehicle passenger with energy replenishment information relating to energy replenishment of a vehicle-driving energy supply source that is capable of storing regenerative energy regenerated from rotational energy of a vehicle wheel, when a remaining energy amount of the energy supply source falls below a determination reference value; and a modification unit configured to modify a provision condition that is a condition on which the provision control unit provides the energy replenishment information, so that after the energy replenishment information is once provided when the remaining energy amount falls below the determination reference value, the energy replenishment information is less likely to be provided than before the energy replenishment information is once provided.

According to the configuration described above, the information relating to energy replenishment is not provided to the vehicle passenger more times than necessary.

The modification unit may be configured to modify the provision condition so that after the energy replenishment information is once provided when the remaining energy amount falls below the determination reference value, the energy replenishment information is less likely to be provided in response to variation in the remaining energy amount caused by the regenerative energy than before the energy replenishment information is once provided. Further, the modification unit may be configured to modify the provision condition so that after the energy replenishment information is once provided when the remaining energy amount falls below the determination reference value, provision of the energy replenishment information is suppressed.

Here, the modification unit may be configured to modify the provision condition by reducing the determination reference value, or may modify the provision condition such that provision of the energy replenishment information is prohibited for a predetermined time after the energy replenishment information is provided initially when the remaining energy amount falls below the determination reference value.

When the remaining energy amount falls below the determination reference value, the provision control unit may be configured to obtain energy replenishment facility information relating to an energy replenishment facility as the energy replenishment information by accessing an information server, and provide the vehicle passenger with the obtained energy replenishment facility information.

According to the configurations described above, the vehicle passenger can obtain the energy replenishment facility information at an appropriate timing. Further, an increase in access to the information server caused by variation in the remaining energy amount due to the regenerative energy can be suppressed. As a result, access to the information server does not become overcrowded, and therefore the facility information can be obtained from the information server quickly.

The provision control unit may be configured to prohibit provision of the energy replenishment facility information when the energy replenishment facility is set as a navigation destination of a vehicle, even if the provision condition is satisfied.

According to the configuration described above, the energy replenishment facility information is not provided to the vehicle passenger more times than necessary. Moreover, access to the information server can be suppressed.

The provision control unit may be configured to provide the vehicle passenger with the energy replenishment facility information when a power supply switch of the vehicle is switched OFF and then switched ON after the energy replenishment facility information is provided. In this case, the provision control unit may be configured to measure an OFF duration of the power supply switch, and when the measured duration exceeds a reference time, the provision control unit may be configured to obtain the energy replenishment facility information by accessing the information server and provide the vehicle passenger with the obtained energy replenishment facility information.

According to the configurations described above, when the driver starts the vehicle after stepping away from the vehicle, the driver can be reminded of the need for energy replenishment and provided with the energy replenishment facility information.

The information provision apparatus may further include a replenishment operation detection unit configured to detect an energy replenishment operation for replenishing the energy supply source with energy, and the modification unit may be configured to return the provision condition to an initial condition when the energy replenishment operation is detected after the provision condition has been modified.

According to the configuration described above, the vehicle passenger can be provided with the energy replenishment information appropriately even following energy replenishment.

The modification unit may be configured to return the provision condition to an initial condition when the remaining energy amount of the energy supply source exceeds a resetting determination reference value that is larger than the determination reference value, after the provision condition has been modified.

According to the configuration described above, the vehicle passenger can be provided with the energy replenishment information appropriately even following energy replenishment.

A second aspect of the invention is an information provision method including: providing a vehicle passenger with energy replenishment information relating to energy replenishment of a vehicle-driving energy supply source that is capable of storing regenerative energy regenerated from rotational energy of a vehicle wheel, when a remaining energy amount of the energy supply source falls below a determination reference value; and modifying a provision condition that is a condition on which the energy replenishment information is provided, so that after the energy replenishment information is once provided when the remaining energy amount falls below the determination reference value, the energy replenishment information is less likely to be provided than before the energy replenishment information is once provided.

According to the configuration described above, similarly to the first aspect, the information relating to energy replenishment is not provided to the vehicle passenger more times than necessary.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a graph illustrating timings at which the information relating to battery charging is provided conventionally.

DETAILED DESCRIPTION OF EMBODIMENTS

Figure 1:
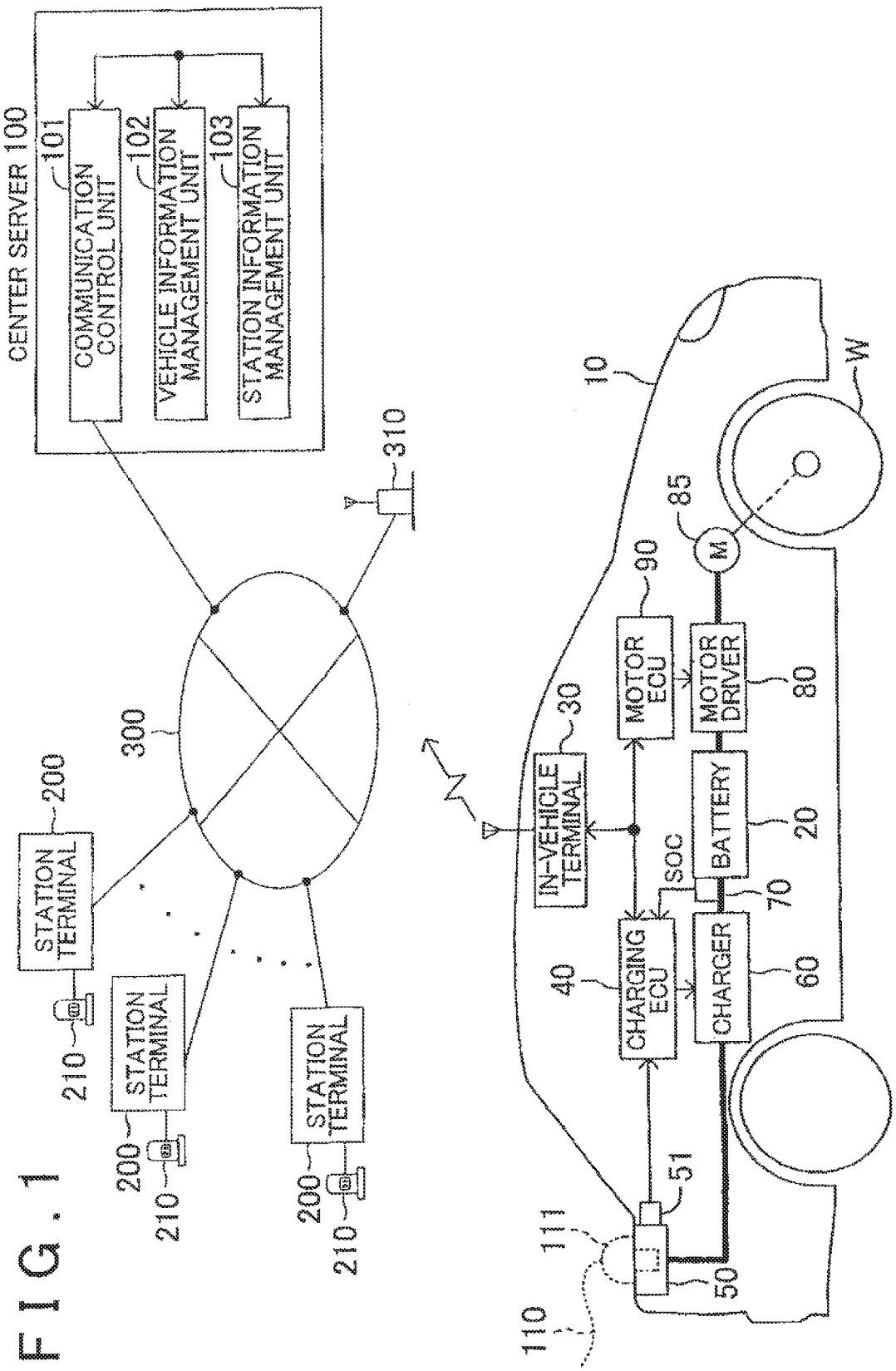
FIG. 1 is a schematic view of a station information provision system to which an information provision apparatus according to an embodiment is applied.

An information provision apparatus according to an embodiment of the invention will be described below using the drawings. FIG. 1 shows a station information provision system. The information provision apparatus according to this embodiment is applied to this station information provision system.

A vehicle 10 applied to the station information provision system is, in this embodiment, an EV in which a travel motor is driven by power from a battery. The vehicle 10 is not limited to an EV, and may be any vehicle having at least a battery as a vehicle-driving energy source, such as a hybrid vehicle that uses both a battery and gasoline fuel as vehicle-driving energy sources or a fuel cell vehicle that uses both a battery and a fuel cell as vehicle-driving energy sources. The station information provision system provides a vehicle passenger with station information relating to a battery charging station. Hence, a plug-in vehicle having a battery that can be charged using an external power supply may be applied as the vehicle 10.

The station information provision system includes an in-vehicle terminal 30 provided in the vehicle 10, a charging control unit 40 (to be referred to as a charging ECU 40 hereafter), a center server 100 provided in a vehicle information center, a station terminal 200 provided in an energy replenishment facility such as a charging station, and a communication network 300 such as the Internet. The communication network 300 connects the in-vehicle terminal 30, the center server 100, and the station terminal 200 to each other communicably. A wireless base station 310 is connected to the communication network 300, and the in-vehicle terminal 30 is connected to the communication network 300 via the wireless base station 310.

A battery 20 of the vehicle 10 can be charged from a household outlet, and when the vehicle 10 is outdoors, the battery 20 can be charged both at a charging station and using a power feeding apparatus 210. The power feeding apparatus 210 is provided in a parking lot of a store such as a convenience store or a shopping center, or a parking lot of an entertainment facility or the like. Hereafter, a facility having the power feeding apparatus 210 will also be referred to as a charging station. The power feeding apparatus 210 is connected to the vehicle 10 using a charging cable 110 in order to supply charging power to the battery 20.

As a configuration for charging the battery 20, the vehicle 10 includes a power receiving port 50 serving as a connection port for a connection plug 111 of the charging cable 110, a charger 60 that converts power supplied to the power receiving port 50 into charging power for the battery 20 and charges the battery 20 therewith, and the charging ECU 40, which controls charging of the battery 20 by the charger 60. The battery 20 includes a SOC detector 70 that detects a state of charge (SOC), which is a value indicating a charging condition of the battery 20. The SOC detector 70 outputs a signal indicating a charging ratio X (%) of the battery 20 to the charging ECU 40 as the SOC. The charging ratio X of the battery 20 corresponds to a remaining capacity of the battery 20, and therefore the charging ratio X of the battery 20 will be referred to hereafter as a remaining battery capacity X. Note that the SOC detector 70 may be configured to detect the remaining capacity of the battery 20.

The power receiving port 50 is provided with a mechanical plug detection switch 51 in which a condition of a contact is switched when the connection plug 111 of the charging cable 110 is inserted. The plug detection switch 51 outputs a plug detection signal to the charging ECU 40. For example, the plug detection switch 51 outputs an ON signal when the connection plug 111 is inserted into the power receiving port 50 and outputs an OFF signal when the connection plug 111 is removed from the power receiving port 50.

As a configuration of a travel driving system, the vehicle 10 includes a motor driver (an inverter, for example) 80 that converts direct current power output from the battery 20 into three-phase alternating current power, a travel motor 85 that is driven by the three-phase alternating current power output from the motor driver 80 to rotate a vehicle wheel W, and a motor control unit 90 (to be referred to hereafter as a motor ECU 90) that controls the output of the motor driver 80 in accordance with a driving operation performed by a driver. When the vehicle wheel W is driven to rotate, the motor ECU 90 uses the power of the battery 20. During braking of the vehicle, on the other hand, the motor ECU 90 controls the motor driver 80 such that the motor 85 is rotated by rotational energy of the vehicle wheel W, and power generated by the motor 85 at this time is charged to the battery 20. The vehicle is thus capable of generating regenerative braking force corresponding to a brake operation.

The charging ECU 40 includes a microcomputer as a main component. During charging of the battery 20, the charging ECU 40 operates the charger 60 to charge the battery 20 until the remaining battery capacity X detected by the SOC detector 70 reaches a target value set by a user. The remaining battery capacity X detected by the SOC detector 70 is also input into the charging ECU 40 during vehicle travel, and when the remaining battery capacity X decreases so as to fall below a determination reference value Xref, the charging ECU 40 executes processing in cooperation with the in-vehicle terminal 30 to prompt a passenger to charge the battery 20 and provide the passenger with information relating to a charging station in the vicinity of the host vehicle. In this processing, the charging ECU 40 outputs a command to the in-vehicle terminal 30 to access the center server 100. Accordingly, the in-vehicle terminal 30 requests information relating to a station in the vicinity of the host vehicle from the center server 100. The in-vehicle terminal 30 then uses the station information transmitted by the center server 100 to inform the passenger of a usable charging station.

Figure 2:
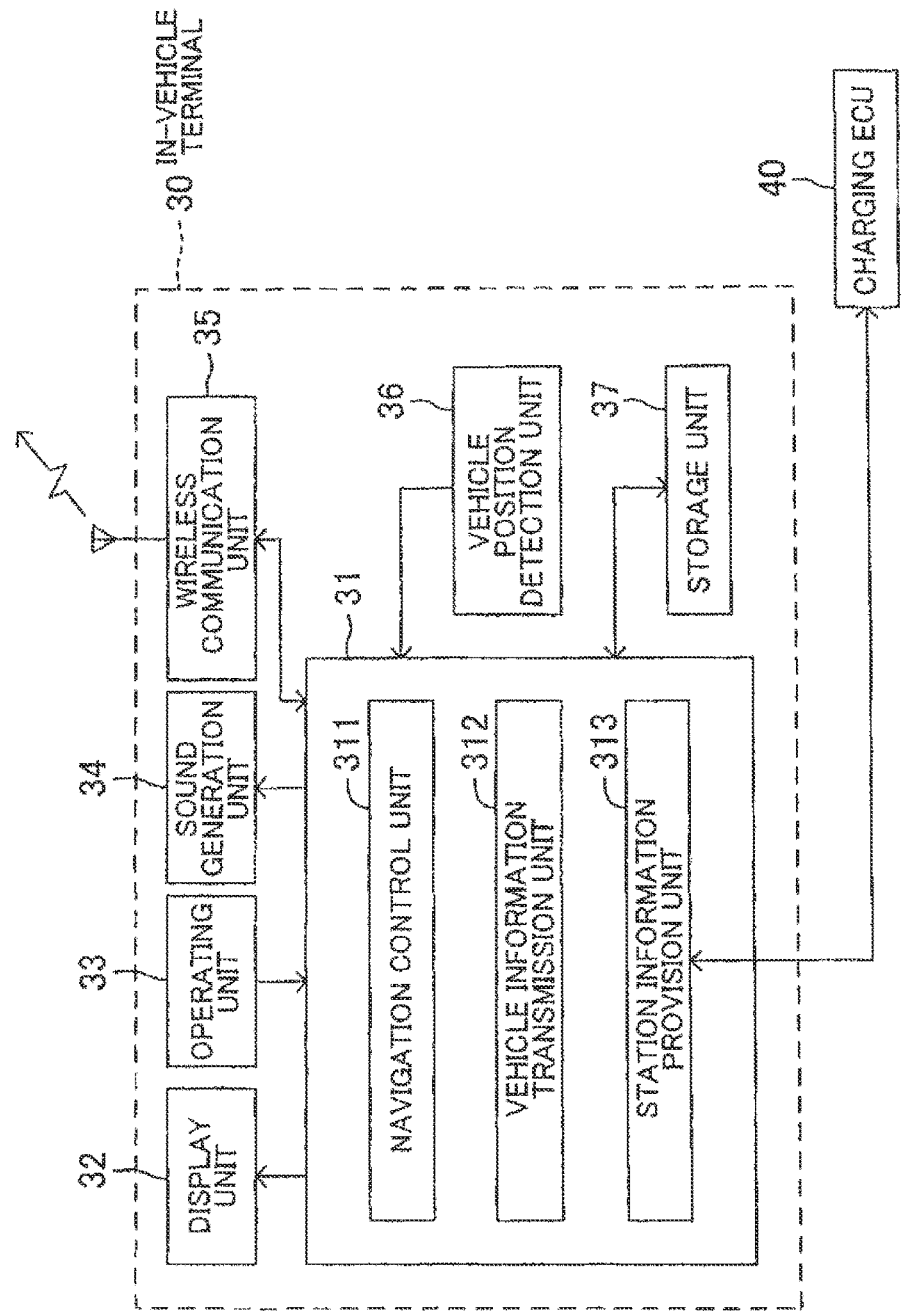
FIG. 2 is a schematic view of an in-vehicle terminal.

As shown in FIG. 2, the in-vehicle terminal 30 includes a main control unit 31 having a microcomputer as a main component, a display unit 32 and an operating unit 33 constituted by a touch panel display, a sound generation unit 34 including an amplifier and a speaker for providing audio guidance, a wireless communication unit 35 for communicating with the outside via the wireless base station 310, a vehicle position detection unit 36 including a global positioning system (GPS) unit that detects current position coordinates of the host vehicle on the basis of radio waves from a GPS satellite and a gyro sensor that detects an advancement direction of the vehicle, and a storage unit 37 that stores map data, facility data such as charging stations, and so on.

The vehicle 10 is provided with a plurality of electronic control units (to be referred to hereafter as vehicle ECUs), not shown in the drawings, for controlling conditions of the vehicle. The respective vehicle ECUs, including the charging ECU 40 and the motor ECU 90, are connected to a controller area network (CAN) communication line of a CAN communication system, and connected to the in-vehicle terminal 30 via the CAN communication line. The vehicle ECUs transmit various vehicle information (for example, traveled distance information, SOC information, vehicle diagnosis information, various request information, and so on) to the center server 100 via the in-vehicle terminal 30 in accordance with preset procedures. On the basis of this vehicle information and external information obtained from the outside, the center server 100 transmits service information that is beneficial to the vehicle passenger to the in-vehicle terminal 30.

Hereafter, with respect to the in-vehicle terminal 30 and the center server 100, only configurations related to the invention, or in other words configurations related to acquisition and provision of the station information, will be described.

The main control unit 31 provided in the in-vehicle terminal 30 includes a navigation control unit 311 that guides the host vehicle to a destination, a vehicle information transmission unit 312 that transmits information relating to the host vehicle (a vehicle ID, current position information, SOC information, and so on) to the center server 100, and a station information provision unit 313 that obtains the station information transmitted front the center server 100 and provides the passenger therewith. The respective function units 311 to 313 are realized by executing a control program of the microcomputer.

The center server 100 is constituted mainly by a microcomputer and a large capacity storage apparatus. As shown in FIG. 1, the center server 100 includes a communication control unit 101 that performs communication control while connected to the communication network 300, a vehicle information management unit 102 that manages the vehicle information together with user information, and a station information management unit 103 that manages the station information.

The station terminal 200 is constituted mainly by a microcomputer. The station terminal 200 is provided at each charging station. The station terminal 200 creates availability information relating to the power feeding apparatus 210 on the basis of a use condition and a reservation condition of the power feeding apparatus 210, and transmits the station information, which is created by attaching a station ID (an ID specifying a charging station) to the availability information, to the center server 100. The availability information indicates the number of usable power feeding apparatuses 210 at a corresponding charging station in each time slot according to a charging method (rapid charging/normal charging). Every time the use condition and reservation condition of the power feeding apparatus 210 change, the station terminal 200 transmits station information updated to the latest availability information to the center server 100.

Every time the station information is transmitted from each station terminal 200, the center server 100 updates the station information stored in the station information management unit 103. The station information management unit 103 stores individual information (a name, an address, a map position, operating hours, and so on of the charging station) corresponding to each station ID in advance such that the individual information can be obtained by specifying the station ID.

In this station information provision system, when the remaining battery capacity X of the vehicle 10 falls below the determination reference value Xref, the in-vehicle terminal 30 accesses the center server 100 to obtain the station information relating to a charging station provided in the vicinity of the vehicle 10 from the center server 100, and provides the passenger with the station information in order to prompt the passenger to charge the battery.

When the vehicle travels on a downhill slope or the like, regenerative braking is performed continuously, and therefore the remaining battery capacity X may increase due to power regeneration. When, in this case, the remaining battery capacity X increases due to power regeneration after falling below the determination reference value Xref and the passenger is once provided with the station information, and then falls below the determination reference value Xref again (i.e. when the remaining battery capacity X straddles the determination reference value Xref), the in-vehicle terminal 30 accesses the center server 100, and as a result, the passenger is provided with the station information again.

Hence, the station information may be provided repeatedly, and in this case, the passenger may feel vexed and anxious. Moreover, access to the center server 100 may become overcrowded such that the station information cannot be obtained from the center server 100 quickly. In this embodiment, therefore, excessive access to the center and information provision to the passenger resulting from variation in the remaining battery capacity X due to power regeneration is reduced.

Figure 3:
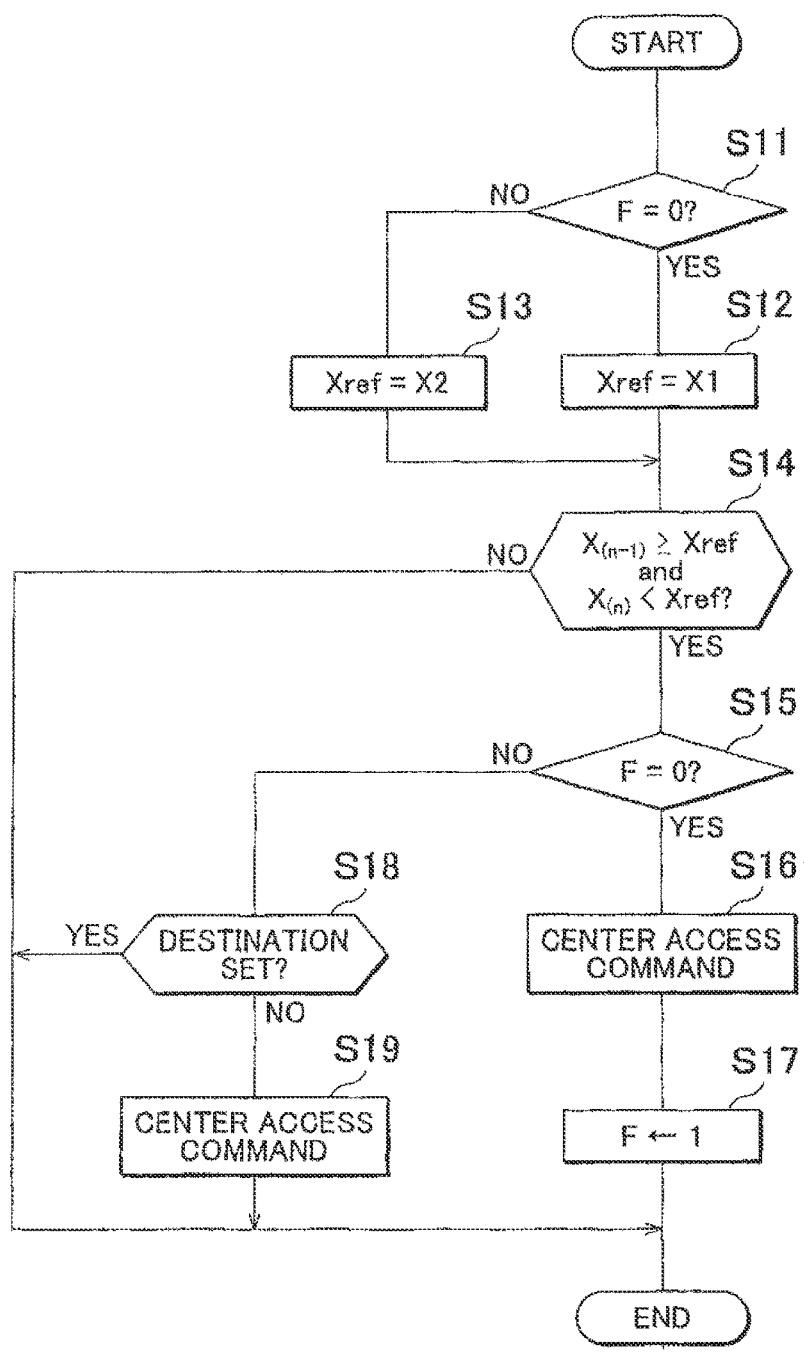
FIG. 3 is a flowchart illustrating a remaining battery capacity reduction detection routine.

Processing relating to provision of the station information to the vehicle passenger will be described below. Provision of the station information doubles as notification of a reduction in the remaining battery capacity. FIG. 3 shows a remaining battery capacity reduction detection routine executed by the charging ECU 40. The remaining battery capacity reduction detection routine is executed repeatedly at intervals of a predetermined period.

When the routine is activated, first, in Step S11, the charging ECU 40 determines whether or not a flag F is at "0". The flag F is set at "1" when a reduction in the remaining battery capacity is detected for a first time, and is therefore set at "0" upon activation of the routine. When the flag F is at "0", or in other words when a reduction in the remaining battery capacity has not yet been detected, the determination reference value Xref of the remaining battery capacity is set at a first reference value X1 in Step S12. When the flag F is at "1", or in other words after a reduction in the remaining battery capacity has been detected, on the other hand, the determination reference value Xref of the remaining battery capacity is set at a second reference value X2 in Step S13. The second reference value X2 is set at a smaller value than the first reference value X1.

Next, in Step S14, the charging ECU 40 reads the remaining battery capacity X detected by the SOC detector 70, and determines whether or not the remaining battery capacity X is smaller than the determination reference value Xref. Here, when the remaining battery capacity X detected in a current calculation period is set as a remaining battery capacity X (n) and the remaining battery capacity X detected in an immediately preceding calculation period is set as a remaining battery capacity X (n−1), Step S14 is used to determine whether or not the remaining battery capacity X (n−1) detected in the immediately preceding calculation period equals or exceeds the determination reference value Xref and whether or not the remaining battery capacity X (n) detected in the current calculation period is smaller than the determination reference value Xref.

When the charging ECU 40 does not determine that the remaining battery capacity X is smaller than the determination reference value Xref (S14: No), the routine is terminated. The processing described above is then repeated at predetermined calculation period intervals. In the meantime, the remaining battery capacity gradually decreases. When, after repeating the processing, the charging ECU 40 determines "Yes" in Step S14, the charging ECU 40 determines whether or not the flag F is set at "0" in Step S15. When the flag F is set at "0" (S15: Yes), the charging ECU 40 outputs a center access command to the in-vehicle terminal 30 in Step S16, and sets the flag F at "1" in Step S17.

Figure 4A:
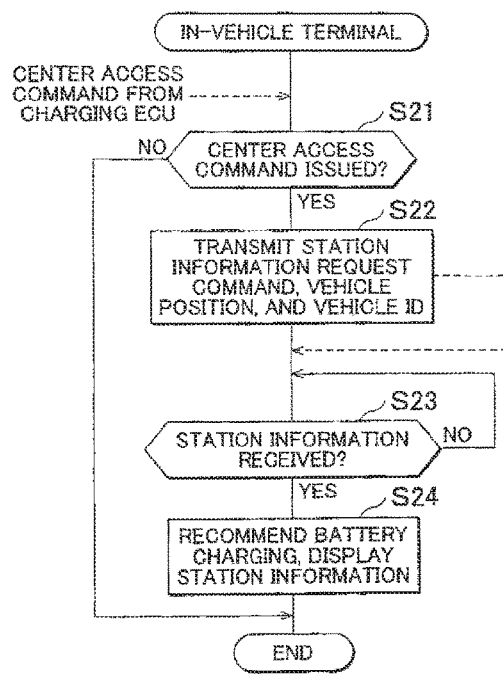
FIG. 4A is a flowchart illustrating a station information acquisition routine.

The in-vehicle terminal 30 executes a station information acquisition routine shown in FIG. 4A. In Step S21, the in-vehicle terminal 30 determines whether or not the center access command has been transmitted from the charging ECU 40. The in-vehicle terminal 30 repeats this determination at predetermined period intervals until the center access command is transmitted. After receiving the center access command (S21: Yes), the in-vehicle terminal 30 transmits a station information request command to the center server 100 in Step S22. In this case, the in-vehicle terminal 30 transmits the position information indicating the position of the host vehicle, detected by the vehicle position detection unit 36, and the vehicle ID together with the station information request command.

Figure 4B:
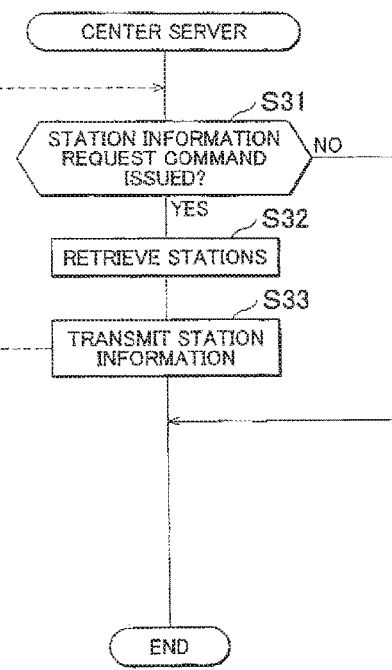
FIG. 4B is a flowchart illustrating a station extraction routine.

The center server 100 executes a station extraction routine shown in FIG. 4B. In Step S31, the center server 100 determines whether or not the station information request command has been transmitted from the in-vehicle terminal 30. The center server 100 repeats this determination at predetermined period intervals until the station information request command is transmitted. After receiving the station information request command (S31: Yes), the center server 100 executes charging station retrieval in Step S32. Charging station retrieval is executed by the station information management unit 103.

The center server 100 retrieves a usable charging station in the vicinity of the host vehicle position on the basis of the latest stored station information. In this case, a predetermined number of charging stations are preferably extracted, starting with the charging station at which charging can practically be started most quickly. For example, charging stations located within a predetermined distance range of the host vehicle position may be extracted in order of a total time of a time required to reach the charging station (a distance from the host vehicle to the charging station/an estimated vehicle speed) and a required wait time following arrival. Alternatively, the predetermined number of charging stations may be extracted by prioritizing the distance from the host vehicle position to the charging station over the time required to start charging. Further, a reachable range of the vehicle may be calculated by obtaining the SOC information (the remaining battery capacity X) of the vehicle, and charging stations located within the reachable range may be used as retrieval subjects. In this case, when the station information request command is transmitted in Step S22, the in-vehicle terminal 30 preferably obtains the SOC information from the charging ECU 40 and transmits the SOC information to the center server 100.

Next, in Step S33, the center server 100 transmits the station information relating to the extracted charging stations to the in-vehicle terminal 30. The station information includes both the position information specifying the positions of the charging stations on a map and information indicating the names, charging methods (rapid charging/normal charging), wait times, operating hours, and so on of the charging stations.

Figure 5:
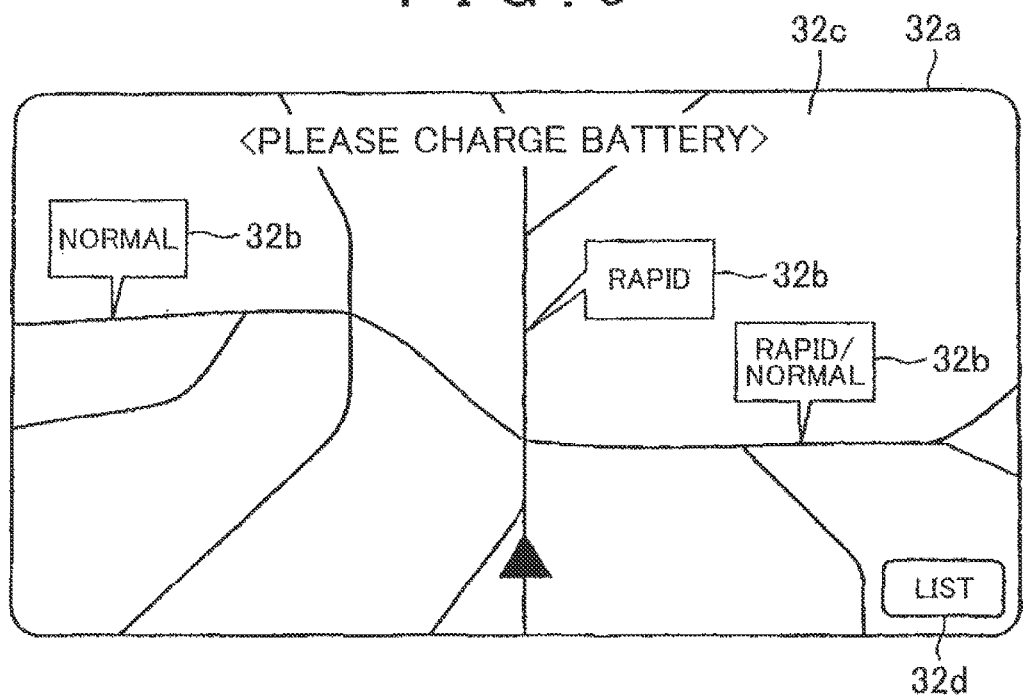
FIG. 5 is a display screen of the in-vehicle terminal.

After transmitting the station information request command in Step S22, the in-vehicle terminal 30 waits to receive the station information from the center server 100 in Step S23. After receiving the station information transmitted from the center server 100 (S23: Yes), the in-vehicle terminal 30 displays an icon 32b showing the charging station positions and a message 32c recommending charging of the battery 20 (for example, "Please charge the battery") on a map display screen 32a of the display unit 32 in Step S24, as shown in FIG. 5. The message recommending charging of the battery 20 may also be output by the sound generation unit 34 in the form of an audio announcement. This display and output of the audio announcement will be referred to as provision of battery charging information.

The in-vehicle terminal 30 displays the charging method inside the icon 32b. For example, "Rapid" is displayed when a power feeding apparatus 210 employing the rapid charging method can be used, "Normal" is displayed when a power feeding apparatus 210 employing the normal charging method can be used, and "Rapid/Normal" is displayed when a power feeding apparatus 210 employing both the rapid charging method and the normal charging method can be used. When the charging method is not determined, the icon 32b is colored gray.

Further, when a specific icon 32b is selected (tapped), the in-vehicle terminal 30 sets the charging station existing in the position of the selected icon 32b as a navigation destination. Furthermore, a list button icon 32d is displayed on the map display screen 32a of the display unit 32, and when the list button icon 32d is tapped, the in-vehicle terminal 30 displays a charging station list screen. The in-vehicle terminal 30 displays information such as the names of the charging stations, distances to the charging stations from the host vehicle, predicted arrival times, and charging wait times on the list screen. When the user selects a charging station from the list screen, the in-vehicle terminal 30 likewise sets the selected charging station as the navigation destination.

The station information acquisition routine performed by the in-vehicle terminal 30 is terminated following execution of the processing of Step S24 and executed repeatedly thereafter at predetermined period intervals. In this case, the battery charging information is displayed continuously on the display unit 32 for a predetermined time. Further, the station extraction routine performed by the center server 100 is terminated following execution of the processing of Step S33 and executed repeatedly thereafter at predetermined period intervals.

Returning to description of the remaining battery capacity reduction detection routine of FIG. 3, after detecting that the remaining battery capacity X has fallen below the determination reference value Xref and outputting the center access command to the in-vehicle terminal 30, the charging ECU 40 sets the flag F at "1". Accordingly, the determination reference value Xref is set at the second reference value X2 from a following calculation period (S13). In other words, after the remaining battery capacity X falls below the determination reference value Xref (X1), the remaining battery capacity X is determined on the basis of the second reference value X2, which is smaller than the first reference value X1, from the following calculation period. Hence, "No" is determined initially in Step S14 after the determination reference value Xref is switched rather than immediately determining "Yes", and as a result, the processing of Steps S11, S13, and S14 is repeated.

In this case, the vehicle passenger has already been provided with the battery charging information using the in-vehicle terminal 30. Therefore, "No" is determined in Step S14 even when the remaining battery capacity X falls below the first reference value X1 after increasing due to power regeneration performed as the vehicle travels on a downhill slope or the like, and as a result, the information relating to battery charging is not provided again.

When, after repeating this processing, the charging ECU 40 determines that the remaining battery capacity X has decreased further so as to fall below the determination reference value Xref (in this case, X2), the charging ECU 40 checks the flag F in Step S15. At this point in time, the flag F is set at "1", and therefore the charging ECU 40 advances the processing to Step S18 in order to determine whether or not a charging station has been set as the navigation destination. This determination is made by reading information indicating a navigation destination setting condition from the in-vehicle terminal 30. When a charging station has not been set as the navigation destination, the charging ECU 40 outputs the center access command to the in-vehicle terminal 30 in Step S19. In response, the in-vehicle terminal 30 obtains the latest station information from the center server 100 by executing the station information acquisition routine described above, and provides the vehicle passenger with the battery charging information.

When, on the other hand, a charging station has been set as the navigation destination, this means that the vehicle passenger intends to charge the battery at a specific charging station, and there is therefore no need to provide the passenger with the information relating to battery charging. Accordingly, the charging ECU 40 skips the processing of Step S19.

Hence, when the vehicle passenger does not take any action in response to the initial provision of the battery charging information and, as a result, the remaining battery capacity X falls below the second reference value X2, the battery charging information is provided again.

Figure 6:
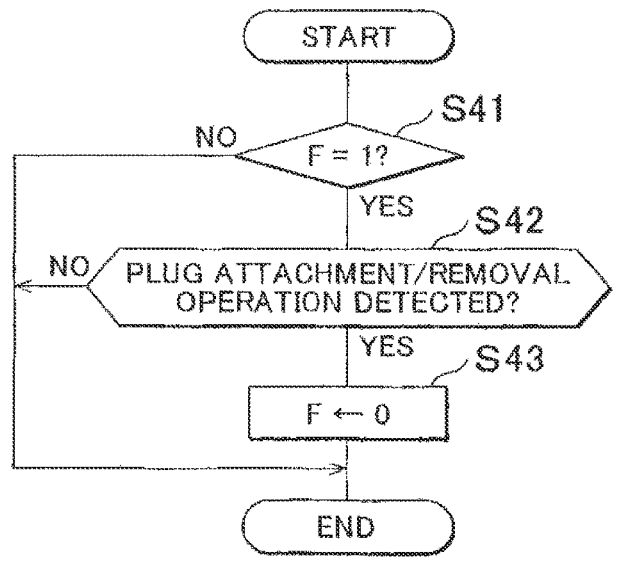
FIG. 6 is a flowchart illustrating a history resetting routine.

Next, processing for resetting a provision history of the battery charging information will be described. FIG. 6 shows a history resetting routine. The history resetting routine is executed by the charging ECU 40 repeatedly at predetermined period intervals in parallel with the remaining battery capacity reduction detection routine described above. In Step S41, the charging ECU 40 determines whether or not the flag F is at "1". When the flag F is at "0", history resetting is not necessary, and therefore the charging ECU 40 terminates the routine. When the flag F is at "1", on the other hand, the charging ECU 40 determines in Step S42 whether or not an operation to attach or remove the connection plug 111 of the charging cable 110 has been performed by reading the signal output by the plug detection switch 51. Step S42 may be any step for determining whether or not an operation relating to charging of the battery 20 has been performed. The determination as to whether or not an operation to attach or remove the connection plug 111 has been performed may therefore be made by detecting either insertion of the connection plug 111 into the power receiving port 50 (i.e. a switch in the plug detection switch 51 from an OFF condition to an ON condition) or removal of the connection plug 111 (i.e. a switch in the plug detection switch 51 from the ON condition to the OFF condition).

The charging ECU 40 repeats the determination processing of Steps S41 and S42 until an operation to attach or remove the connection plug 111 is performed. After detecting an operation to attach or remove the connection plug 111 (S42: Yes), the charging ECU 40 resets the flag F to "0" in Step S43.

As a result, the determination reference value Xref of the remaining battery capacity reduction detection routine is returned to the first reference value X1 serving as an initial value (S12). The battery 20 is charged by inserting the connection plug 111 of the charging cable 110 into the power receiving port 50. Therefore, by detecting insertion or removal of the connection plug 111 into or from the power receiving port 50, the start or the end of charging of the battery 20 can be estimated, and accordingly, the determination reference value Xref, can be returned to its initial condition.

Figure 7:
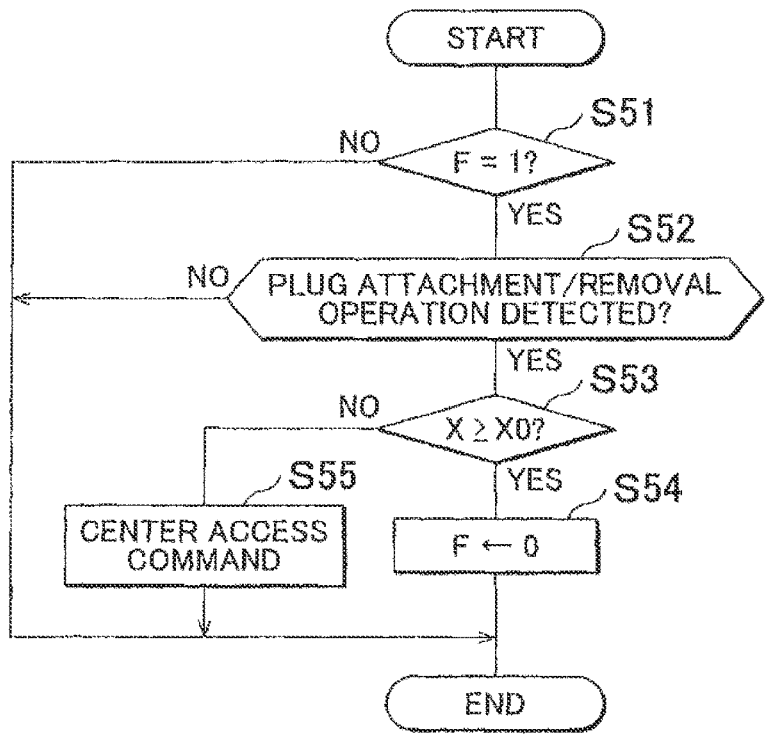
FIG. 7 is a flowchart illustrating a first modified example of the history resetting routine.

When the battery 20 is charged, a charging amount thereof may be small, and as a result, the remaining battery capacity X may either not reach the first reference value X1 or exceed the first reference value X1 by a narrow width. A first modified example of the history resetting routine, in which the vehicle passenger is provided with the battery charging information even in such a case, will now be described. FIG. 7 shows the first modified example of the history resetting routine. This history resetting routine is executed by the charging ECU 40 repeatedly at predetermined period intervals in parallel with the remaining battery capacity reduction detection routine described above. In Step S51, the charging ECU 40 determines whether or not the flag F is at "1". When the flag F is at "0", history resetting is not necessary, and therefore the charging ECU 40 terminates the routine.

When the flag F is at "1", on the other hand, the charging ECU 40 determines in Step S52 whether or not the connection plug 111 of the charging cable 110 has been removed from the power receiving port 50 by reading the signal output by the plug detection switch 51. In this case, a determination is made as to whether or not the plug detection switch 51 has been switched from the ON condition to the OFF condition. The charging ECU 40 repeats the determination processing of Steps S51 and S52 until the connection plug 111 is removed from the power receiving port 50. After determining that the connection plug 111 has been removed from the power receiving port 50 (S52: Yes), the charging ECU 40 determines in Step S53 whether or not the remaining battery capacity X detected by the SOC detector 70 equals or exceeds a reset reference value X0. When the remaining battery capacity X equals or exceeds the reset reference value X0 (S53: Yes), the charging ECU 40 resets the flag F to "0" in Step S54. The reset reference value X0 is set at a larger value than the first reference value X1.

When the remaining battery capacity X is smaller than the reset reference value X0 (S53: No), on the other hand, the charging ECU 40 transmits the center access command to the in-vehicle terminal 30 in Step S55. In response, the in-vehicle terminal 30 obtains the latest station information from the center server 100 by executing the station information acquisition routine described above, and provides the vehicle passenger with the battery charging information. Hence, according to the first modified example, in a case where the battery is charged insufficiently, the battery charging information is provided again when the connection plug 111 is removed, and therefore the battery 20 can be charged again if necessary, enabling an improvement in user-friendliness. Note that in Step S55 in this case, a message indicating that the battery has been charged insufficiently may simply be issued instead of performing center access.

Figure 8:
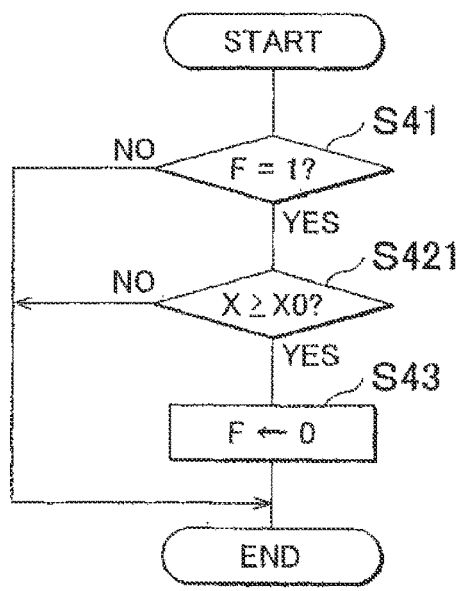
FIG. 8 is a flowchart illustrating a second modified example of the history resetting routine.

Further, the history resetting processing may be implemented regardless of the operations performed on the connection plug 111. For example, the charging ECU 40 may execute a second modified example of the history resetting routine, shown in FIG. 8. In the second modified example of the history resetting routine, Step S421 is implemented in place of Step S42 in the history resetting routine shown in FIG. 6. The processing of Steps S41 and S43, meanwhile, is identical to that of the embodiment shown in FIG. 6. In Step S421, the charging ECU 40 determines whether or not the remaining battery capacity X equals or exceeds the reset reference value X0. The reset reference value X0 is set in advance at a larger value than the first reference value X1. To ensure that center access is not performed repeatedly, the reset reference value is set at a value estimated to be impossible for the remaining battery capacity X to reach as a result of power regeneration after falling below the first reference value X1.

After determining in Step S421 that the remaining battery capacity X equals or exceeds the reset reference value X0, the charging ECU 40 resets the flag F at "0" in Step S43. Hence, when the battery 20 is charged from an external power supply such as the power feeding apparatus 210, the provision history of the battery charging information is reset. This example can be implemented even on a vehicle not including a configuration for detecting attachment and removal of the connection plug 111.

Figure 9:
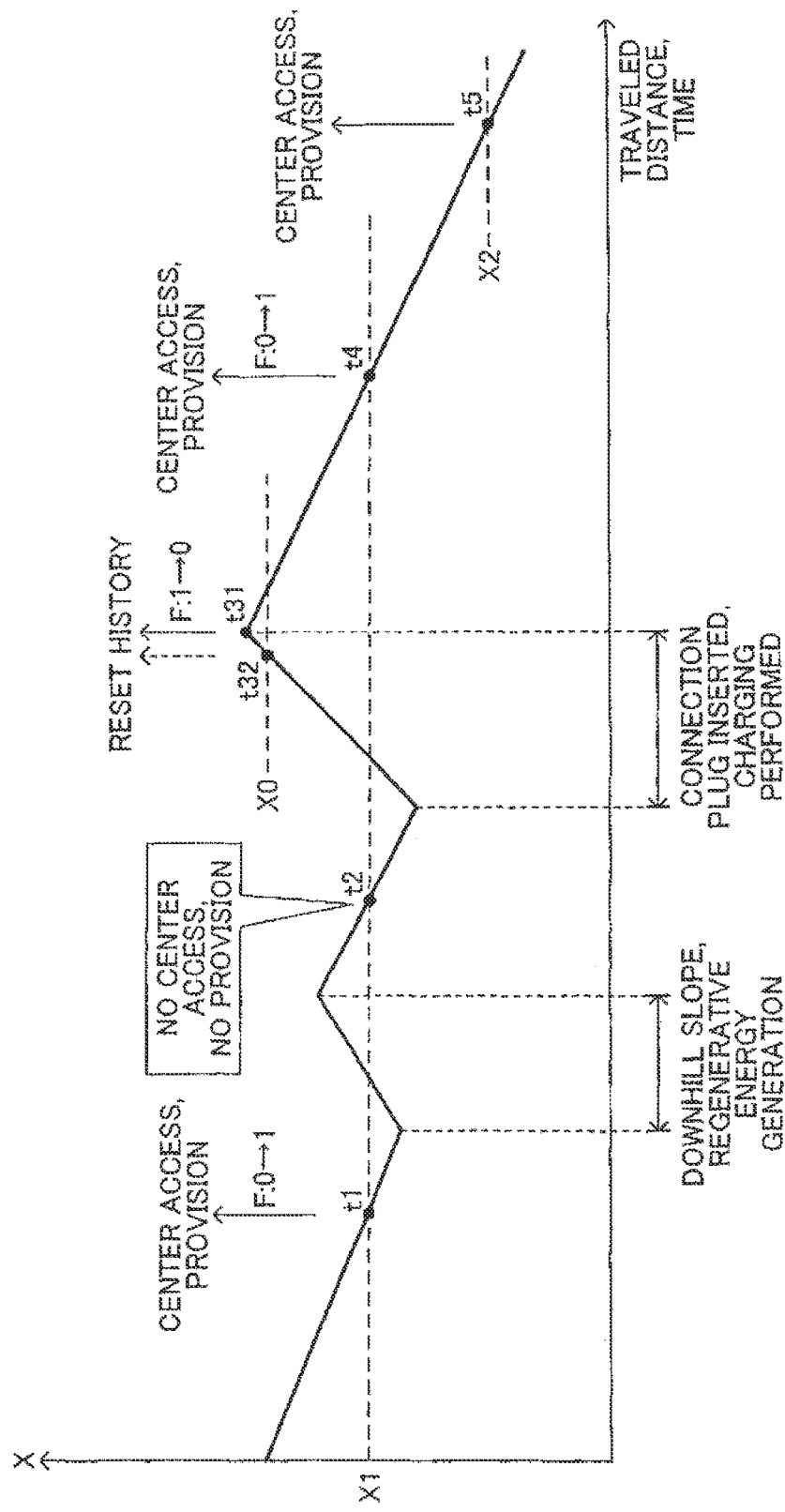
FIG. 9 is a graph illustrating timings at which information relating to battery charging is provided.

Next, timings at which the battery charging information is provided (information provision is performed) will be described using FIG. 9. FIG. 9 is an image diagram illustrating transitions of the remaining battery capacity X according to the embodiment described above and timings at which center access and information provision are performed. At a time t1, when the remaining battery capacity X falls below the first reference value X1, center access and information provision are performed for the first time. At this time, the flag F is set at "1". When the vehicle 10 travels on a downhill slope, regenerative power is stored in the battery 20. As a result, the remaining battery capacity X increases beyond the first reference value X1. When the downhill slope ends, the remaining battery capacity X starts to decrease, and at a time t2, the remaining battery capacity X falls below the first reference value X1. However, the determination reference value Xref has been switched to the second reference value X2 (X2<X1), and therefore center access and information provision are not performed at this time.

The connection plug 111 of the charging cable 110 is then inserted into the power receiving port 50 to start charging the battery 20, and at either a time t31 when the connection plug 111 is removed (or a time when the connection plug 111 is inserted) or a time t32 when the remaining battery capacity X reaches the reset reference value X0, the flag F is set at "0". As a result, the information provision history is reset and the determination reference value Xref is returned to the first reference value X1.

When the remaining battery capacity X decreases below the first reference value X1 thereafter (time t4), center access and information provision are performed for the first time, and when the remaining battery capacity X falls below the second reference value X2 before the battery is charged (time t5), center access and information provision are performed for a second time.

Next, a modified example of the battery charging information provision processing will be described. In the embodiment described above, the battery charging information is provided when the remaining battery capacity X falls below the determination reference value Xref, but in this modified example, the following processing is executed additionally. When a driver returns to the vehicle after stepping away, the driver may forget that the remaining battery capacity is low. Hence, in this modified example, the driver is prevented from forgetting to charge the battery by providing the driver with the battery charging information in such a case.

Figure 10:
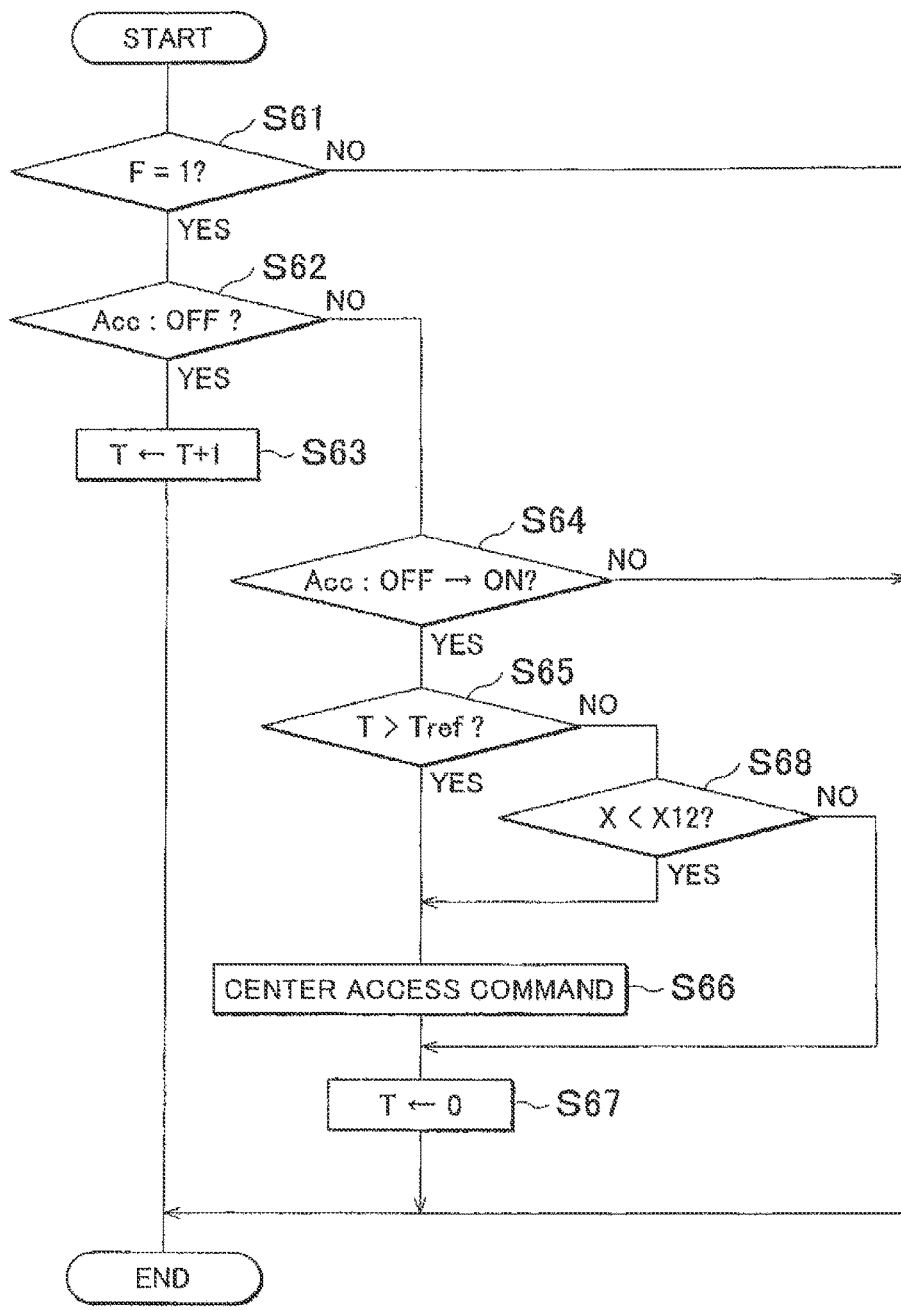
FIG. 10 is a flowchart illustrating a startup center access command routine.

FIG. 10 shows a startup center access command routine executed by the charging ECU 40. The startup center access command routine is executed repeatedly at predetermined period intervals in parallel with the remaining battery capacity reduction detection routine and the history resetting routine described above. When the startup center access command routine is activated, the charging ECU 40 determines in Step S61 whether or not the flag F is at "1". In other words, the charging ECU 40 determines whether or not the battery charging information has been provided in response to a reduction in the remaining battery capacity. When the flag F is not at "1", the routine is terminated. When the flag F is at "1", the charging ECU 40 determines in Step S62 whether or not an accessory switch (not shown) serving as a power supply switch of the vehicle is in an OFF condition. When the accessory switch is in the OFF condition (S62: Yes), the charging ECU 40 increments a time measuring tinier value T by a value of 1 in Step S63, and then terminates the routine. The time measuring timer value T is set at zero when the routine is activated. The routine is executed repeatedly at predetermined period intervals, and therefore, when the accessory switch is switched OFF after the battery charging information has been provided, measurement of an OFF duration thereof is started.

When, after repeating this processing, the charging ECU 40 detects the ON condition of the accessory switch in Step S62, the charging ECU 40 determines in Step S64 whether or not the accessory switch has been switched from the OFF condition to the ON condition in the immediate past, or in other words whether or not the condition of the accessory switch detected in an immediately preceding calculation period was the OFF condition. When the accessory switch has been switched from the OFF condition to the ON condition in the immediate past (S64: Yes), the charging ECU 40 determines in Step S65 whether or not the time measuring timer value T exceeds a reference time Tref. When the time measuring tinier value T exceeds the reference time Tref, the driver may have forgotten that the remaining battery capacity has decreased. Moreover, it is likely that the station information has been updated. Therefore, in Step S66, the charging ECU 40 outputs the center access command. In response, the in-vehicle terminal 30 obtains the latest station information from the center server 100 by executing the station information acquisition routine described above, and provides the vehicle passenger with the battery charging information. Further, in Step S67, the charging ECU 40 resets the time measuring timer value T.

When, on the other hand, the time measuring timer value T does not exceed the reference time Tref in Step S65, the charging ECU 40 determines in Step S68 whether or not the remaining battery capacity X detected by the SOC detector 70 is smaller than a reference value X12. The reference value X12 is set at a value that is smaller than the first reference value X1 and larger than the second reference value X2, for example. When the remaining battery capacity X is smaller than the reference value X12, the charging ECU 40 advances to Step S66 and outputs the center access command to remind the driver forcefully of the reduction in the remaining battery capacity, even if the OFF duration of the accessory switch is short. When the remaining battery capacity X equals or exceeds the reference value X12, on the other hand, the charging ECU 40 skips the processing of Step S66 and resets the time measuring timer value T in Step S67.

Further, when the accessory switch has not been switched from the OFF condition to the ON condition in the immediate past in Step S64, the charging ECU 40 terminates the routine.

Hence, according to the startup center access command routine, when the driver starts the vehicle after stepping away from the vehicle for a long time or when the remaining battery capacity X is low, the driver can be reminded of the reduction in the remaining battery capacity and provided with the latest station information.

Likewise in this modified example, the center access command is preferably not output in a case where a charging station has already been set as the navigation destination when the accessory switch is switched from the OFF condition to the ON condition. For example, processing for determining whether or not a navigation destination has been set may be provided between Step S64 and Step S65 such that when a charging station has been set as the navigation destination, the processing is advanced to Step S67, and when a charging station has not been set as the navigation destination, the processing is advanced to Step S65.

Further, in this modified example, the duration of the OFF condition of the accessory switch is measured, but instead, a time extending from a point at which the passenger was most recently provided with the station information obtained from the center server 100 to a point at which the accessory switch is switched ON (OFF→ON) may be measured, and the center access command may be output when this measured time exceeds the reference time Tref.

With the information provision apparatus according to the embodiment described above, after the battery charging information has been once provided in response to a reduction in the remaining battery capacity, the determination reference value Xref is reduced from the initial first reference value X1 to the second reference value X2 so that center access and provision of the battery charging information are less likely to be performed than before the battery charging information is once provided. That is, after the battery charging information has been once provided in response to a reduction in the remaining battery capacity, center access and provision of the battery charging information are suppressed. Accordingly, center access and provision of the battery charging information are not performed in response to variation in the remaining battery capacity due to power regeneration. As a result, provision of the battery charging information more times than necessary can be suppressed. Further, a frequency with which the information provision apparatus accesses the center server 100 can be reduced, and therefore communication is less likely to become overcrowded, meaning that the station information can be obtained quickly when required.

Moreover, when a charging station has been set as the navigation destination, center access and provision of the battery charging information are prohibited thereafter. As a result, information provision is not performed unnecessarily, and therefore an information provision apparatus that is even more user-friendly for the vehicle passenger can be provided.

Furthermore, in the modified example, when the driver starts the vehicle after stepping away from the vehicle following provision of the battery charging information, the battery charging information is provided again, and therefore the driver can be reminded that the remaining battery capacity has decreased. Further, information provision during vehicle startup is performed when the OFF duration of the accessory switch exceeds the reference time or the remaining battery capacity X is smaller than the reference value X12, and therefore information provision can be performed at an even more appropriate timing.

Moreover, the processing to reset the provision history of the battery charging information is performed by detecting an operation to attach or remove the connection plug 111, and therefore the provision history can be reset at an appropriate timing. As a result, the vehicle passenger can be provided with the battery charging information appropriately even after the battery has been charged. Furthermore, with the configuration whereby the battery charging information is provided upon removal of the connection plug 111 when the battery has not been charged sufficiently, the passenger can be alerted that the battery has not been charged sufficiently, leading to an increase in convenience.

Note that the charging ECU 40 and the in-vehicle terminal 30 according to this embodiment function as the information provision apparatus according to the invention.

The information provision apparatus according to this embodiment was described above, but the invention is not limited to the above embodiment, and various modifications may be implemented within a scope that does not depart from the object of the invention.

For example, the various set values (the first reference value X1, the second, reference value X2, the reference value X12, the reset reference value X0, the reference time Tref) may be set at desired values by the user by operating the operating unit 33 of the in-vehicle terminal 30. Alternatively, the various set values may be set by the center server 100.

Figure 11:
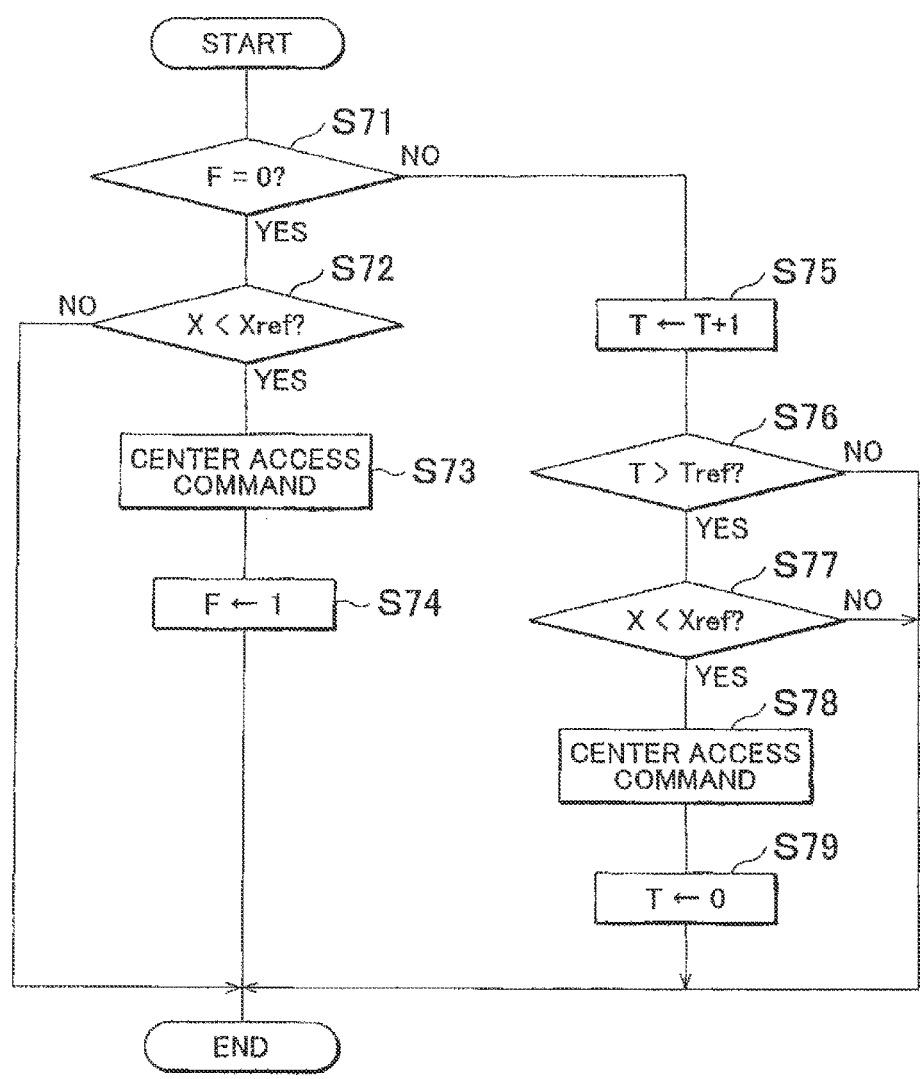
FIG. 11 is a flowchart illustrating a modified example of the remaining battery capacity reduction detection routine.

Further, in the above embodiment, after the battery charging information has been provided initially, provision of the battery charging information and center access are made less likely by modifying the determination reference value Xref, but instead, for example, provision of the battery charging information and center access may be made less likely by providing a prohibition period during which provision of the battery charging information and center access are prohibited for a predetermined time after the battery charging information has been provided initially. As an example of this configuration, FIG. 11 shows a modified example of the remaining battery capacity reduction detection routine executed by the charging ECU 40.

When this routine is activated, the charging ECU 40 determines in Step S71 whether or not the flag F is at "0". When the flag F is at "0", the charging ECU 40 determines in Step S72 whether or not the remaining battery capacity X is smaller than the determination reference value Xref (X1).

When the remaining battery capacity X equals or exceeds the determination reference value Xref, the charging ECU 40 terminates the routine. When, after repeating this processing, the charging ECU 40 determines that the remaining battery capacity X is smaller than the determination reference value Xref (S72: Yes), the charging ECU 40 outputs the center access command to the in-vehicle terminal 30 in Step S73, and sets the flag F at "1" in Step S74. Accordingly, "No" is determined in Step S71 in the following calculation period, and therefore the charging ECU 40 advances the processing to Step S75.

When the flag F is not at "0", on the other hand, the charging ECU 40 increments the time measuring timer value T by a value of 1 in Step S75, and then determines whether or not the time measuring timer value T exceeds the reference time Tref. When the time measuring tinier value T does not exceed the reference time Tref, the routine is terminated. When, after repeating this processing, the charging ECU 40 determines that the time measuring timer value T exceeds the reference time Tref (S76: Yes), the charging ECU 40 determines in Step S77 whether or not the remaining battery capacity X is smaller than the determination reference value Xref (X1). When the remaining battery capacity X is smaller than the determination reference value Xref, the charging ECU 40 outputs the center access command to the in-vehicle terminal 30 in Step S78, and resets the time measuring timer value T in Step S79. When the remaining battery capacity X equals or exceeds the determination reference value Xref, the charging ECU 40 skips the processing of Steps S78 to S79. The reference time Tref is set such that the information relating to battery charging is less likely to be provided in response to variation in the remaining battery capacity X due to power regeneration.

According to this modified example, following initial access to the center server 100 and provision of the battery charging information to the vehicle passenger, center access is prohibited until the reference time Tref elapses, and therefore the battery charging information is not provided. Further, every time the reference time Tref elapses, the remaining battery capacity X is compared to the determination reference value Xref, and when the remaining battery capacity X is smaller than the determination reference value Xref, center access is performed and the battery charging information is provided. Thus, center access and provision of the battery charging information are less likely to be performed in response to variation in the remaining battery capacity X due to power regeneration. As a result, provision of the battery charging information more times than necessary can be suppressed. Further, the frequency with which the center server 100 is accessed can be reduced, and therefore communication is less likely to become overcrowded, meaning that the station information can be obtained quickly when required.

As another method of making the provision of information relating to energy replenishment less likely, provision of the information relating to energy replenishment may be prohibited when charging of an energy supply source (the battery 20) using regenerative energy is detected. For example, when it is determined that a remaining energy amount has increased beyond a determination reference value after falling below the determination reference value, provision of the information relating to energy replenishment may be prohibited even if the remaining energy amount falls below the determination reference value thereafter. Note that the "remaining energy amount" may directly represent an amount of energy, but is not limited thereto, and may also be a value that serves as an index for determining a degree of energy consumption, such as a ratio between an amount of stored energy in the energy supply source and a capacity of the energy supply source.

Further, in this embodiment, the information provision apparatus is constituted by the in-vehicle terminal 30 and the charging ECU 40. However, the remaining battery capacity reduction detection routine executed by the charging ECU 40 may be performed by the in-vehicle terminal 30, for example, and in this case, the information provision apparatus may be constituted by the in-vehicle terminal 30 alone.

Furthermore, this embodiment may be applied to an EV, which is a vehicle in which the battery 20 can be charged externally, or a plug-in type hybrid vehicle or the like. However, the invention is not limited to a plug-in vehicle, and may be applied to any vehicle having a vehicle-driving energy supply source that is capable of storing regenerative energy regenerated from rotational energy of a vehicle wheel. For example, the invention may be applied to a non-plug-in type hybrid vehicle that uses both a battery and fuel as vehicle-driving energy supply sources. In this case, a sum of an index I1 representing the remaining battery capacity and an index I2 representing a remaining fuel amount is set as an index I (I=I1+I2) of the remaining energy amount, and the information relating to energy replenishment of the energy supply source is provided when the index I of the remaining energy amount falls below a determination reference value Iref. When the vehicle travels on a downhill slope or the like, the index I of the remaining energy amount may increase due to energy regeneration (power regeneration to the battery). Hence, provision of the information relating to energy replenishment can be made less likely by reducing the determination reference value Iref or prohibiting center access for a reference time, for example, after the index I of the remaining energy amount falls below the determination reference value Iref initially such that center access is performed and the information (gas station information, for example) relating to energy replenishment (fuel replenishment) is provided.

The invention may also be applied to a non-plug-in type fuel cell vehicle that uses both a battery and a fuel cell as vehicle-driving energy supply sources. In this case, a sum of the index I1 representing the remaining battery capacity and an index I2 representing a remaining fuel amount of the fuel cell may be set as the index I (I=I1+I2) of the remaining energy amount, whereupon similar processing to that of the hybrid vehicle described above is performed.

Moreover, in the above embodiment, the vehicle passenger is both prompted to charge the battery and provided with the charging station information (facility information), but the charging station information may be omitted so that the vehicle passenger is simply prompted to charge the battery.

Furthermore, as regards the history resetting processing, the history resetting processing based on detection of the charging operation (FIG. 6 or FIG. 7) may be combined with the history resetting processing based on the remaining battery capacity X (FIG. 8) such that the history resetting processing performed when either one of the resetting conditions is satisfied.

The invention claimed is:
1. An information provision apparatus comprising:
a provision control unit configured to provide a vehicle passenger with energy replenishment information relating to energy replenishment of a vehicle-driving energy supply source that is capable of storing regenerative energy regenerated from rotational energy of a vehicle wheel, when a remaining energy amount of the energy supply source falls below a first determination reference value; and
a modification unit configured to modify a provision condition that is a condition on which the provision control unit provides the energy replenishment information, so that after the energy replenishment information is once provided when the remaining energy amount falls below the first determination reference value, the energy replenishment information is provided when the remaining energy amount falls below a second determination reference value,
wherein the second determination reference value is a smaller value than the first determination reference value,
wherein the provision control unit is configured to determine whether to provide the vehicle passenger with energy replenishment information based on the provision condition modified by the modification unit, after the energy replenishment information is once provided, and
wherein the modification unit is further configured to modify the provision condition such that provision of the energy replenishment information is prohibited for a predetermined time after the energy replenishment information is once provided when the remaining energy amount falls below the first determination reference value.

2. The information provision apparatus according to claim 1, wherein the modification unit is configured to modify the provision condition so that after the energy replenishment information is once provided when the remaining energy amount falls below the first determination reference value, the energy replenishment information is provided in response to a larger variation in the remaining energy amount caused by the regenerative energy than before the energy replenishment information is once provided.

3. The information provision apparatus according to claim 1, wherein the modification unit is configured to modify the provision condition so that after the energy replenishment information is once provided when the remaining energy amount falls below the first determination reference value, provision of the energy replenishment information is suppressed.

4. The information provision apparatus according to claim 1, wherein the modification unit is configured to modify the provision condition by reducing the first determination reference value.

5. The information provision apparatus according to claim 1, wherein the provision control unit configured to obtain energy replenishment facility information relating to an energy replenishment facility as the energy replenishment information by accessing an information server when the remaining energy amount falls below the first determination reference value, and provide the vehicle passenger with the obtained energy replenishment facility information.

6. The information provision apparatus according to claim 5, wherein the provision control unit prohibits provision of the energy replenishment facility information when the energy replenishment facility is set as a navigation destination of a vehicle, even if the provision condition is satisfied.

7. The information provision apparatus according to claim 5, wherein the provision control unit is configured to provide the vehicle passenger with the energy replenishment facility information when a power supply switch of the vehicle is switched OFF and then switched ON after the energy replenishment facility information is provided.

8. The information provision apparatus according to claim 7, wherein the provision control unit is configured to measure an OFF duration of the power supply switch, and when the measured OFF duration exceeds a reference time, obtain the energy replenishment facility information by accessing the information server and provide the vehicle passenger with the obtained energy replenishment facility information.

9. The information provision apparatus according to claim 1, further comprising a replenishment operation detection unit configured to detect an energy replenishment operation for replenishing the energy supply source with energy, wherein the modification unit is configured to return the provision condition to an initial condition when the energy replenishment operation is detected after the provision condition has been modified.

10. The information provision apparatus according to claim 1, wherein the modification unit is configured to return the provision condition to an initial condition when the remaining energy amount of the energy supply source exceeds a resetting determination reference value that is larger than the first determination reference value, after the provision condition has been modified.

11. The information provision apparatus according to claim 1, wherein the energy replenishment information is no longer provided based on the remaining energy amount falling below the first determination reference value until either the energy supply source is replenished so that the remaining energy amount of the energy supply source exceeds a resetting determination reference value that is larger than the first determination reference value or is replenished using an external power supply.

12. An information provision method comprising:
providing a vehicle passenger with energy replenishment information relating to energy replenishment of a vehicle-driving energy supply source that is capable of storing regenerative energy regenerated from rotational energy of a vehicle wheel, when a remaining energy amount of the energy supply source falls below a first determination reference value;
modifying a provision condition that is a condition on which the energy replenishment information is provided, so that after the energy replenishment information is once provided when the remaining energy amount falls below the first determination reference value, the energy replenishment information is provided when the remaining energy amount falls below a second determination reference value; and
modifying the provision condition such that provision of the energy replenishment information is prohibited for a predetermined time after the energy replenishment information is once provided when the remaining energy amount falls below the first determination reference value,
wherein the second determination reference value is a smaller value than the first determination reference value, and
wherein the energy replenishment information is provided to the vehicle passenger based on the modified provision condition, after the energy replenishment information is once provided.

13. The information provision method according to claim 12, wherein the energy replenishment information is no longer provided based on the remaining energy amount falling below the first determination reference value until either the energy supply source is replenished so that the remaining energy amount of the energy supply source exceeds a resetting determination reference value that is larger than the first determination reference value or is replenished using an external power supply.

14. An information provision apparatus comprising:
a provision control unit configured to provide a vehicle passenger with energy replenishment information relating to energy replenishment of a vehicle-driving energy supply source that is capable of storing regenerative energy regenerated from rotational energy of a vehicle wheel, when a remaining energy amount of the energy supply source falls below a first determination reference value; and
a modification unit configured to modify a provision condition that is a condition on which the provision control unit provides the energy replenishment information, so that after the energy replenishment information is once provided when the remaining energy amount falls below the first determination reference value, the energy replenishment information is provided when the remaining energy amount falls below a second determination reference value,
wherein the second determination reference value is a smaller value than the first determination reference value,
wherein the provision control unit configured to obtain energy replenishment facility information relating to an energy replenishment facility as the energy replenishment information by accessing an information server when the remaining energy amount falls below the first determination reference value, and provide the vehicle passenger with the obtained energy replenishment facility information,
wherein the provision control unit prohibits provision of the energy replenishment facility information when the energy replenishment facility is set as a navigation destination of a vehicle, even if the provision condition is satisfied, and
wherein the modification unit is further configured to modify the provision condition such that provision of the energy replenishment information is prohibited for a predetermined time after the energy replenishment information is once provided when the remaining energy amount falls below the first determination reference value.

15. The information provision apparatus according to claim 14, wherein the provision control unit is configured to provide the vehicle passenger with the energy replenishment facility information when a power supply switch of the vehicle is switched OFF and then switched ON after the energy replenishment facility information is provided.

16. The information provision apparatus according to claim 15, wherein the provision control unit is configured to measure an OFF duration of the power supply switch, and when the measured OFF duration exceeds a reference time, obtain the energy replenishment facility information by accessing the information server and provide the vehicle passenger with the obtained energy replenishment facility information.

17. The information provision apparatus according to claim 14, wherein the energy replenishment information is no longer provided based on the remaining energy amount falling below the first determination reference value until either the energy supply source is replenished so that the remaining energy amount of the energy supply source exceeds a resetting determination reference value that is larger than the first determination reference value or is replenished using an external power supply.

\* \* \* \* \*